May 8, 1956  G. K. MEDICUS  2,745,062
ELECTROSTATIC INSTRUMENTS WITH MAGNETIC SUSPENSIONS
Filed Feb. 26, 1952
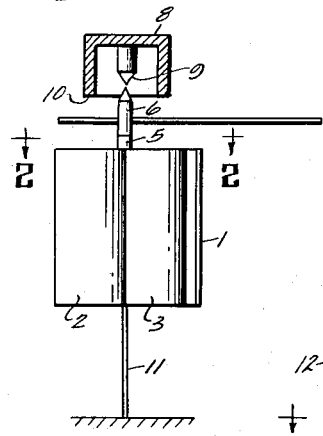
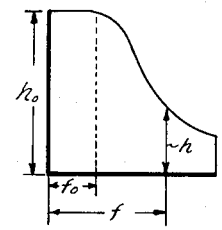
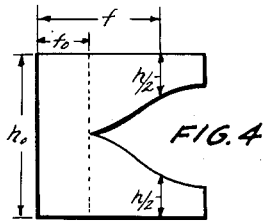
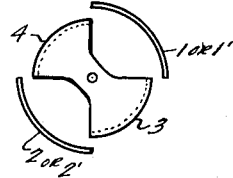
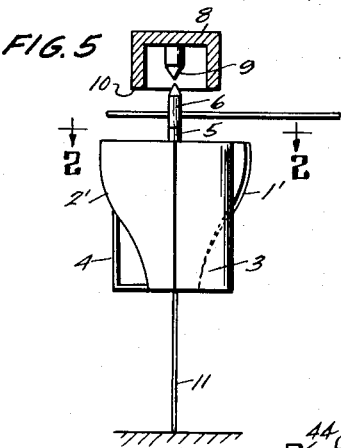
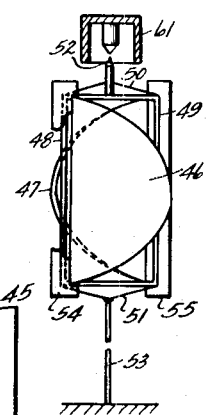
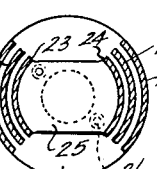
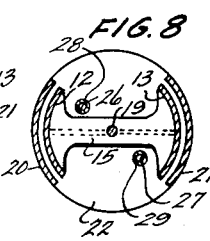
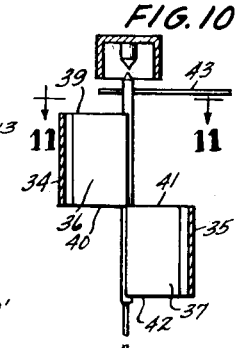
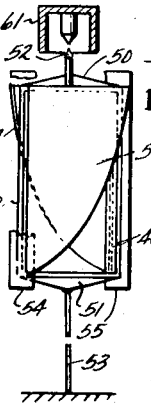
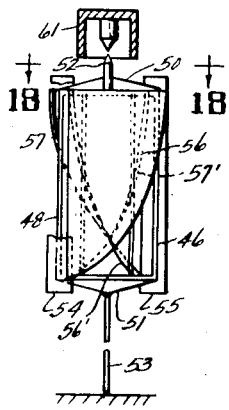
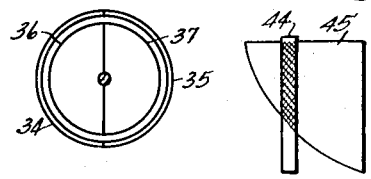
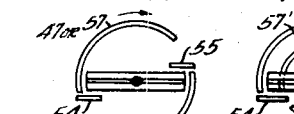
INVENTOR.
GUSTAV K. MEDICUS
By James S. Shannon
Wade Romity
ATTORNEY
AGENT

United States Patent Office 2,745,062
Patented May 8, 1956

2,745,062

ELECTROSTATIC INSTRUMENTS WITH MAGNETIC SUSPENSIONS

Gustav K. Medicus, Dayton, Ohio

Application February 26, 1952, Serial No. 273,533

1 Claim. (Cl. 324—109)

(Granted under Title 35, U. S. Code (1952), sec. 266)

The invention described herein may be manufactured and used by or for the Government for governmental purposes without payment to me of any royalty thereon.

This invention relates to electrostatic instruments and has as its object the design of an electrostatic instrument of high sensitivity and good mechanical properties.

The mechanical qualities of conventional electrostatic instruments are poor in comparison with those of other types of electrical instruments. This is due mainly to the small ratio of back-turning moment to the moment of inertia of the moving system. This results from the relatively high moment of inertia of the plane electrodes positioned perpendicularly to the axis of rotation that are usually found in conventional electrostatic instruments. In accordance with the invention, the moment of inertia of the moving electrode system is reduced by the use of cylindrical electrodes extending parallel to the axis of rotation and concentric therewith.

Cylindrical moving electrodes, however, require a suspension offering greater lateral stability than is furnished by conventional gravity or torsion fiber types of suspensions. Bearing type suspensions provide sufficient lateral stability but for sensitive instruments the bearing friction is prohibitive. In accordance with the invention this difficulty is overcome by the use of a magnetic suspension which is frictionless and at the same time provides the required degree of stability for cylindrical electrodes.

The invention will be explained more fully in connection with the specific embodiments thereof shown in the accompanying drawings, in which Figs. 1 and 2 show a simple magnetic suspension and cylindrical electrode structure in accordance with the invention;

Figs. 3, 4 and 5 show electrode shapes for giving a desired characteristic to an electrostatic instrument;

Figs. 6, 7 and 8 show an electrostatic instrument utilizing both surfaces of the moving electrodes;

Fig. 9 shows a modification of Fig. 6;

Figs. 10 and 11 show an electrostatic instrument with 180° deflection;

Figs. 12 and 13 illustrate the theory of a strip type moving electrode for an electrostatic instrument;

Figs. 14, 15 and 16 show electrostatic instruments employing strip moving electrodes;

Figs. 17 and 18 show an electrostatic instrument with a strip type moving electrode in which both inner and outer surfaces of the moving electrode are utilized.

Referring to Figs. 1 and 2, the electrostatic instrument shown comprises a pair of cylindrical stationary electrodes 1 and 2 and a moving electrode structure providing axially symmetrical cylindrical surfaces 3 and 4. The moving electrode is mounted on shaft 5 which has a tip 6 of magnetic material at its upper end. A suitable pointer 7 may be attached to the shaft. A pot magnet 8 having a center pole 9 and an outer annular pole 10 is fixedly positioned concentrically with respect to the axis of stationary electrodes 1-2. A torsion fiber 11 is attached at one end to an axial point on the moving electrode and at the other end to an axial point on the body of the instrument. The length of the fiber 11 is made such as to provide a small air gap between the tip 6 and the center pole 9. The magnetic attraction between tip 6 and center pole 9 keeps fiber 11 taut and also exerts a centering force on the tip 6 which provides the necessary lateral stability for the moving electrode.

The stationary electrodes 1 and 2 and moving electrode surfaces 3 and 4 are each shown in Figs. 1 and 2 as having extents of 90°. The instrument is shown in its zero deflection position, in which the capacity between the stationary and moving electrode systems has its minimum value. If a voltage is applied between the stationary and moving electrode systems the moving electrode will rotate in a direction to increase the capacity between the two electrode systems. The capacity increasing direction in Fig. 2 is clockwise as indicated by the arrow. The maximum capacity or full deflection position will be reached after a 90° clockwise rotation of the moving electrode.

Electrodes of the form shown in Figs. 1 and 2 impart a quadratic characteristic to the instrument, the deflection being proportional to the square of the voltage applied between the moving and stationary electrodes. The characteristic may be altered, for example, to make it linear or logarithmic, by suitably shaping either the stationary or the moving electrodes. Figs. 3 and 4 show suitable contours for either the stationary or moving electrodes to provide a substantially linear characteristic. In these figures, which are planar representations of the cylindrical electrodes, $h$ represents the axial dimension of the electrode and $f$ the deflection angle. For values of $f$ greater than $f_0$, $h(f)$ decreases with increasing values of $f$ and, for values of $f$ less than $f_0$, $h=h_0$. Since $h(f)$ approaches infinity as $f$ approaches zero $f_0$ is chosen to give a practical value for $h_0$. The characteristic of the instrument is therefore quadratic for values of $f$ less than $f_0$ and $h(f)$ is selected so as to give a linear or other desired characteristic for values of $f$ greater than $f_0$.

As already stated the structures shown in Figs. 3 and 4 may be used for either the moving or the stationary electrodes. Their use as moving electrodes has the advantage of reduced moment of inertia of the moving system but has the disadvantage that the rigidity is also reduced. The rigidity is considerably better, however, in the case of Fig. 4 in which the electrode is symmetrical to a plane perpendicular to the axis of rotation of the electrode system. On the other hand, since the time of rest is proportional only to the square root of the moment of inertia of the moving system, in most cases it will be preferable to have $h=h_0=$constant in the case of the moving electrodes with the stationary electrodes taking the form dictated by the characteristic desired, which, for a linear characteristic, is shown in Fig. 3 or Fig. 4. Although this choice results in some increase in the time of rest this is offset by the gain in stability and simplicity of the moving system.

Fig. 5 shows an instrument in which the electrode contour shown in Fig. 3 is used for the stationary electrodes. This instrument is similar in all respects to that of Fig. 1 with the exception that the characteristic is substantially linear.

The instruments shown in Figs. 1 and 5 utilize only the outer surfaces of the moving electrode. The sensitivity of an instrument of this type may be increased by utilizing both surfaces of the moving electrode as shown in Figs. 6, 7 and 8, these figures also showing additional magnetic means for increasing the lateral stability of the moving electrode system. Referring to Figs. 6, 7 and 8, the moving electrode system is similar to that of Figs. 1 and 5 and comprises two axially symmetrical electrodes 12 and 13 in the form of 90° sectors of a cylinder. Electrodes 12 and 13 are joined at the ends by cross members 14 and 15 which may be stiffened by ribs 16 and 17. Ferromagnetic pins 18 and 19 are attached to cross members 14 and 15 and are concentric with the axis of electrodes 12 and 13. The stationary electrodes consist of outer electrodes 20 and 21 joined by base 22 and inner electrodes 23 and 24 joined by base 25. Base 25 is attached to base 22 and supported at proper height relative thereto by screws 26 and 27 and sleeves 28 and 29 which also serve to electrically connect the inner and outer stationary electrodes.

The rotating electrode structure is positioned and held in proper relation to the stationary electrode structure by pot magnets 30 and 31. The magnets are fixedly attached to the body of the instrument, magnet 31 being supported by base 25, and are concentric with the axis of the cylindrical electrodes. A torsion fiber 32 is attached at one end to pin 19 and at the other end to an axial point 33 on the body of the instrument. The length of the fiber is such as to provide a small air gap between the ends of pins 18 and 19 and the ends of the center poles of magnets 30 and 31. In Figs. 6, 7 and 8, the moving electrode system is shown in its fully deflected or maximum capacity position.

A modification of Fig. 6 which results in a more compact structure is shown in Fig. 9. In this modification magnet 31 and pin 19 are replaced by magnet 31' and pin 19', respectively. These elements differ from their counterparts in Fig. 6 in that they are provided with axial passageways through which the fiber 32 passes. With this arrangement the fiber may be attached to an axial point at the base of pin 18, rather than at the base of pin 19 as in Fig. 6, so that the greater part of its length is within the electrode structure. The adjacent edges of pin 19' and the center pole of magnet 31' are sharpened to provide accurate centering.

The instruments already described have a full deflection of 90°. It is possible to produce greater deflections up to 180° by axially displacing the two halves of the electrode structure. When so displaced the angular extent of the electrodes may be increased up to 180°. Fig. 10 shows an instrument having 180° deflection. The stationary electrodes are made up of half cylinders 34 and 35, and the movable electrodes are composed of half cylinders 36 and 37 attached to shaft 38 by end plates 39, 40, 41 and 42. The magnetic suspension of the moving electrode structure is similar to those already described. It is also possible to use only half of the electrode structure of Fig. 10, for example, stationary electrode 34 and movable electrode 36. In this case the pointer 43 may be given sufficient weight to balance the electrode 36 and associated end plates 39 and 40. The stationary electrodes in these cases also may be shaped to obtain a desired characteristic as explained in connection with Figs. 3, 4 and 5.

In the preceding embodiments of the invention the size of the moving electrodes is commensurate with that of the stationary electrodes. In the designs shown in Figs. 14–18, the moving electrodes are small circumferentially relative to the stationary electrodes thus accomplishing a further reduction in the moment of inertia of the moving system. The principles involved are illustrated in Figs. 12 and 13. If the moving electrode 44 is in the form of a strip and the stationary electrodes 45 and 45' take forms such as shown in Figs. 12 and 13, then movement of electrode 44 to the right increases the area indicated by crosshatching and, as a result, the capacity between the moving and stationary electrodes increases. Therefore the application of a voltage between the two electrodes would cause a deflection of the moving electrode to the right or in the direction of increasing capacity. The contours of electrodes 45 and 45' may be chosen to give a desired characteristic to the instrument. Those shown in Figs. 12 and 13 result in a substantially linear characteristic.

Figs. 14 and 15 show an electrostatic instrument designed in accordance with the principles of Figs. 12 and 13. The stationary electrodes 46 and 47 are similar to electrode 45 in Fig. 12. The moving electrode system consists of thin metallic flat or cylindrical electrodes 48 and 49 having circumferential widths that are small compared to the extent of the stationary electrodes in the direction of deflection. The electrodes 48 and 49 are joined at both ends by rigid cross members 50 and 51. A magnetic suspension, similar to ones already described and consisting of pot magnet 61, ferromagnetic pin 52 attached to cross member 50, and torsion fiber 53, provides a frictionless support for the moving electrode system. Shields 54 and 55, maintained at the same potential as the moving electrodes, serve to prevent reverse deflection of the instrument. The embodiment of Fig. 16 is the same as that in Fig. 14 except for the stationary electrodes 56 and 57 which have the form shown in Fig. 13. The sectional view in Fig. 15 is equally applicable to Fig. 16. The embodiment shown in Figs. 17 and 18 is similar to that shown in Fig. 16 with the addition of inner stationary electrodes 56' and 57' so that both surfaces of the moving electrodes 46 and 48 are utilized. Electrodes 56' and 57' have the same form and angular extent as electrodes 56 and 57.

The modification shown in Fig. 9 is equally applicable to the instruments shown in Figs. 14–18.

The arrangements of Figs. 14–18 make possible the realization of extremely light moving systems. For instance, it is possible to make the electrodes 46 and 48 very thin metallic ribbons which are not themselves rigid but which are extended between the rigid cross members 50 and 51 by the magnetic force exerted on pin 52. In this way the rigidity of the moving system is not attained by its static structure, but is established by the tension furnished by the magnetic suspension which makes possible a reduction of structural mass.

Due to the small moments of inertia and back-turning moments of the above described structures sufficient damping will normally be supplied by the air friction of the moving system.

A modification of the magnetic suspension shown in this application that is suitable for use with the electrode structures of this application is described and claimed in my application Ser. No. 273,531, filed February 26, 1952 now Patent No. 2,713,523.

I claim:

An electrostatic instrument comprising a stationary electrode structure having two cylindrical surfaces concentric with and symmetrical to a vertical axis, the axial dimensions of said surfaces increasing from a minimum value at one end to a maximum value at the other end; an electrode structure rotatable about said axis having two cylindrical surfaces concentric with and symmetrical to said axis and of small circumferential dimension relative to the circumferential dimension of said stationary electrode surfaces, said two cylindrical surfaces being formed by a pair of thin non-rigid metallic ribbons extending between the ends of upper and lower rigid metallic cross members; fixed annular magnetic pole means concentric with said axis; annular ferromagnetic pin means, shaped so as to be self-centering relative to said pole means, attached to said upper cross member at its center and positioned below said pole means; a torsion fiber attached at one end to the center of said lower cross member and at the other end to a fixed point on said axis below said lower cross member; the length of said fiber being such as to position said pin means in close but not touching relationship to said pole means, and the magnetic force of said pole means being such that said metallic ribbons and said fiber are placed in tension by the magnetic attraction between said pole means and said pin means.

(References on following page)

References Cited in the file of this patent

UNITED STATES PATENTS

| | | |
|---|---|---|
| 513,975 | Ayrton et al. | Feb. 6, 1894 |
| 530,145 | Weston | Dec. 4, 1894 |
| 610,928 | Thomson | Sept. 20, 1898 |
| 675,996 | Gutmann | June 11, 1901 |
| 1,472,198 | Taylor | Oct. 30, 1923 |
| 2,396,464 | Handley | Mar. 12, 1946 |

FOREIGN PATENTS

| | | |
|---|---|---|
| 23,991 of 1904 | Great Britain | May 4, 1905 |
| 68,119 | Austria | Mar. 10, 1915 |